United States Patent [19]
Zaguroli, Jr.

[11] Patent Number: 5,590,756
[45] Date of Patent: Jan. 7, 1997

[54] GRAVITY CONVEYOR WITH RETURN

[75] Inventor: James Zaguroli, Jr., Drayton Plains, Mich.

[73] Assignee: Knight Industries, Inc., Auburn Hills, Mich.

[21] Appl. No.: 498,353

[22] Filed: Jul. 5, 1995

Related U.S. Application Data

[63] Continuation-in-part of Ser. No. 381,499, Jan. 31, 1995, Pat. No. 5,549,192.

[51] Int. Cl.$^6$ .................................................. B65G 35/08
[52] U.S. Cl. ...................... 198/795; 198/803.01; 104/163
[58] Field of Search .................................... 198/793, 795, 198/803.01, 580, 561, 562; 104/162, 163

[56] References Cited

U.S. PATENT DOCUMENTS

| | | | |
|---|---|---|---|
| 4,088,220 | 5/1978 | Jacksch et al. | 198/793 X |
| 4,712,670 | 12/1987 | Burkhardt | 198/803.01 |

FOREIGN PATENT DOCUMENTS

| | | | |
|---|---|---|---|
| 1200543 | 9/1965 | Germany | 198/795 |
| 0223608 | 12/1984 | Japan | 198/795 |
| 1652226 | 5/1991 | U.S.S.R. | 198/803.01 |

*Primary Examiner*—James R. Bidwell
*Attorney, Agent, or Firm*—John R. Benefiel

[57] ABSTRACT

A drive mechanism for driving roller supported trolleys around a radiused track to the upper end of a gravity conveyor, in which one or more rotating members each have a spring-loaded element which is retracted as the member rotates across the top of a trolley and is spring extended into a recess in the top of the trolley to establish a driving contact. The trolley is then swept around the radiused track by rotation of the rotating member. The elements may comprise pivotally mounted inclined dogs which allow overrunning of the trolleys when impacted from the rear by succeeding trolleys. The trolleys may also be controllably lowered at the other end of the conveyor by rotation of a second powered rotary member having similar spring-loaded elements.

8 Claims, 5 Drawing Sheets

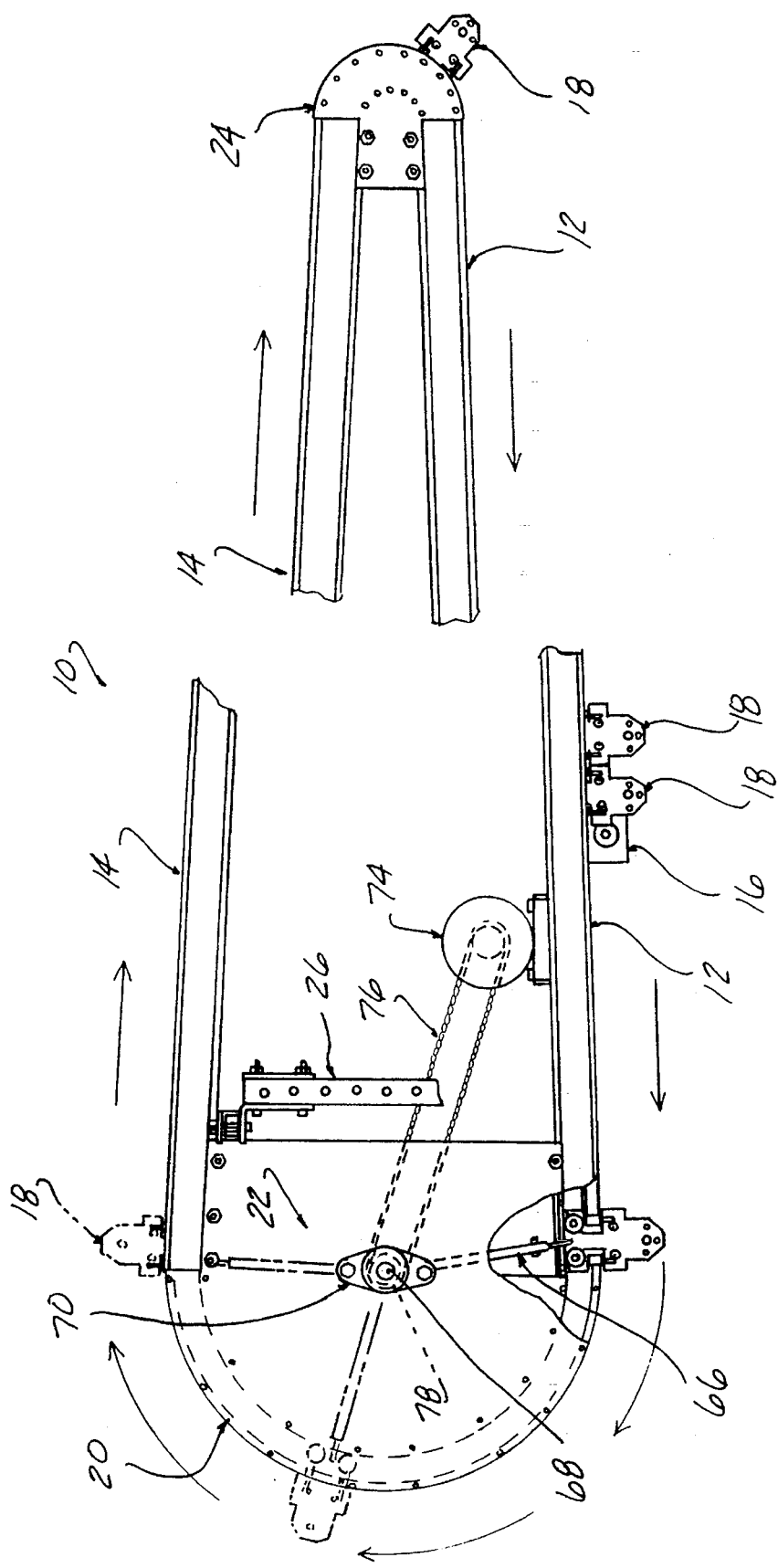

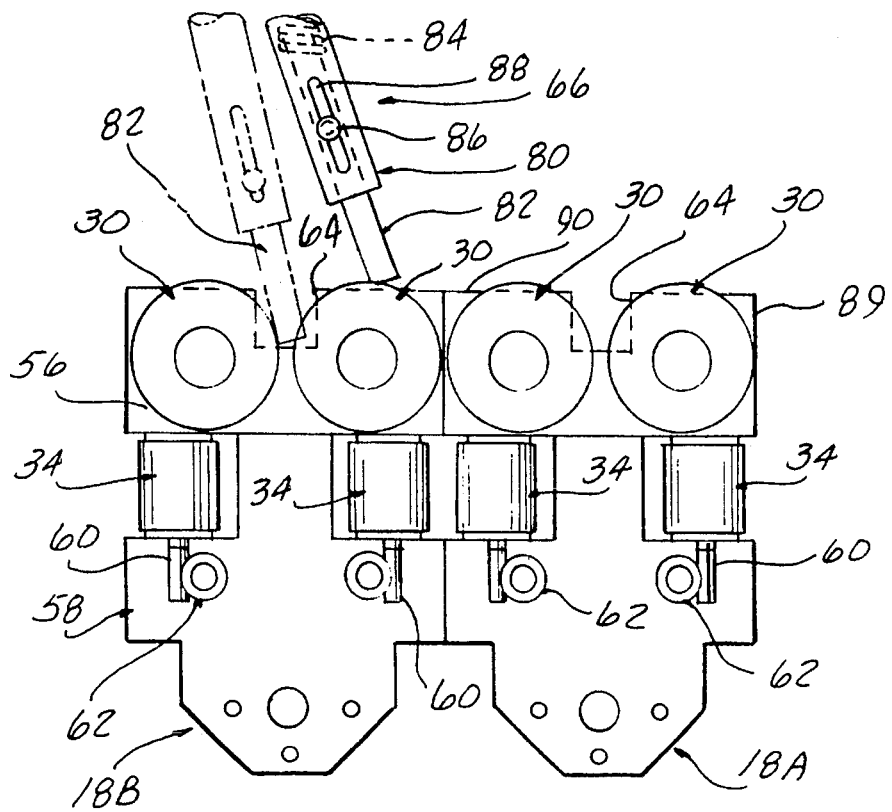
FIG. 4
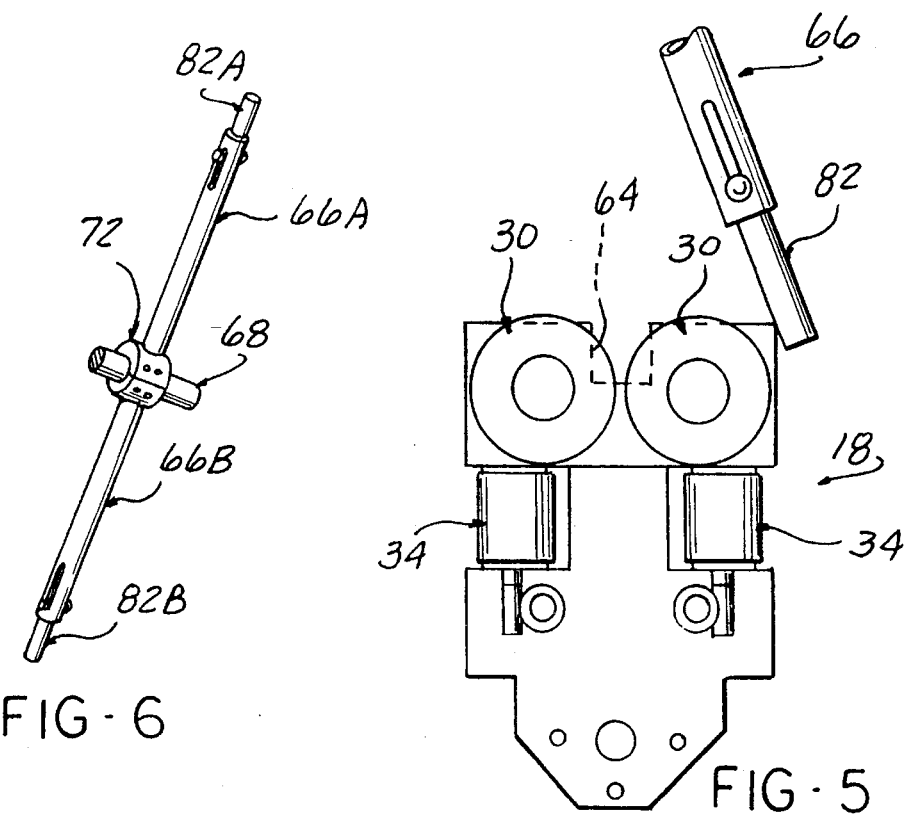
FIG. 6
FIG. 5

GRAVITY CONVEYOR WITH RETURN

CROSS-REFERENCE TO RELATED APPLICATION

This application is a continuation-in-part of application Ser. No. 08/381,499, filed on Jan. 31, 1995, U.S. Pat. No. 5,549,192.

FIELD OF THE INVENTION

This invention concerns conveyors and more particularly gravity conveyors of the type including a series of load carrying trolleys successively advanced along inclined return and advance conveyor sections by gravity, and more particularly gravity conveyors having return mechanisms for returning the trolleys from the low end of the lower conveyor section to an elevated position at the high end of the upper section via a radiused end section to reposition movement of the trolleys along the inclined sections, and also lowering mechanisms for controlled lowering of the trolleys from the low end of the upper section to the high end of the lower section via a second radiused end section.

BACKGROUND DISCUSSION

There has heretofore been developed a gravity conveyor of the type including upper and lower return and advance inclined guideway sections positioned one above the other, with opposite adjacent ends converging and diverging respectively. Each section supports a number of load holding trolleys which roll from the high end of each section of the guideway to the opposite end. The trolleys are driven to an elevated position above an unload end of the inclined lower section for gravity return along the upper section to the load end of the conveyor section via a radiused track end section at the lower end of the upper section. Another radiused track end section allows movement of the trolleys down to the lower section at the other end.

It is sometimes desirable that such conveyors be used as "accumulators" in which a series of the trolleys is allowed to queue up at the unload end enabling a stock piled or "float" quantity of parts at the unload end of the conveyor lower section. Such queuing has created problems in the mechanism used to elevate the trolleys to the upper end of the return section of the conveyor since reliable engagement with an individual trolley is rendered more difficult by the presence of the other queued trolleys.

Accordingly, it is an object of the present invention to provide a trolley drive mechanism for moving the trolleys around the radiused end sections of the gravity conveyor in which the individual trolleys are reliably engaged notwithstanding the presence of other queued trolleys presented for return to the upper return section of the conveyor.

SUMMARY OF THE INVENTION

This and other objects of the present invention which will become apparent upon a reading of the following specification and claims are achieved by a trolley drive mechanism comprised of one or more engagement elements carried by a rotary member mounted for rotation about the center of the radiused track end section, the rotary member driven by an electric motor. The outer end of each engagement element is mounted to be movable radially inward against a spring bias. When the rotary member is rotated, each engagement element sweeps through the queuing location whereat the trolleys queue up for return. Each trolley is formed with a notched recess in the top portion thereof. Each spring-loaded engagement element may be radially retracted as it sweeps over the top surface of the trolley until moving into registry with the engagement recess of the leading trolley. The engagement element is then moved radially outward into the trolley recess by the spring to establish a driving engagement with the trolley, causing the leading trolley to be swept along the radiused track end section to be delivered in an inverted state onto the upper return run of the gravity conveyor sections.

In the event there is only a single trolley at the return loading location, a side of the engagement element engages a trailing side edge of the single trolley which is thereby drivingly engaged for advance along the radiused track end section to be deposited at the beginning of the return section of the gravity conveyor.

In a first embodiment, the engagement element comprises a spring-loaded plunger carried at an outer end of a rod extending from the rotary hub. One or more rods can be mounted to the rotary hub.

In a second preferred embodiment, a first sprocket having a series of inclined dogs each comprising an engagement element are pivotally mounted around the periphery of the sprocket. Each dog has an engagement end surface which is movable radially outward as the dog moves about its pivotal mounting. A spring urges the outward pivotal movement so that the end surface moves into the trolley recess as the sprocket rotates to bring the end engagement surface into alignment with the recess, the engagement end surface forced to be retracted radially inward if the end surface initially encounters the top surface adjacent the recess, moving across the top surface until aligned with the recess.

Each dog presents a sloping surface on the side from which the trolleys approach, so that the stress forces caused by impacting of successive trolleys is reduced by limited overrunning of one or more engaged trolleys.

A powered second sprocket having pivoted dogs is also preferably provided at the lowering end section of the conveyor to provide controlled descent of the trolleys around a second radiused track end section.

The powered sprockets can be used to control feed of the trolleys in lieu of separately controlled stop pins by controlled operation of the sprocket drive motors.

DESCRIPTION OF THE DRAWINGS

FIG. 1 is a fragmentary side elevational view, partially broken away, of a gravity conveyor equipped with the return drive mechanism according to the present invention.

FIG. 4 is an enlarged side elevational view of a pair of queued load holding trolleys, and a fragmentary view of the drive rod assembly shown in phantom in a succeeding position.

FIG. 5 is a side elevational view of a single load holding trolley showing a drive rod assembly plunger in engagement therewith.

FIG. 6 is a perspective view of a dual drive rod assembly of a double drive rod configuration used in an alternate embodiment of the drive mechanism according to the present invention.

DETAILED DESCRIPTION

Figure 3:
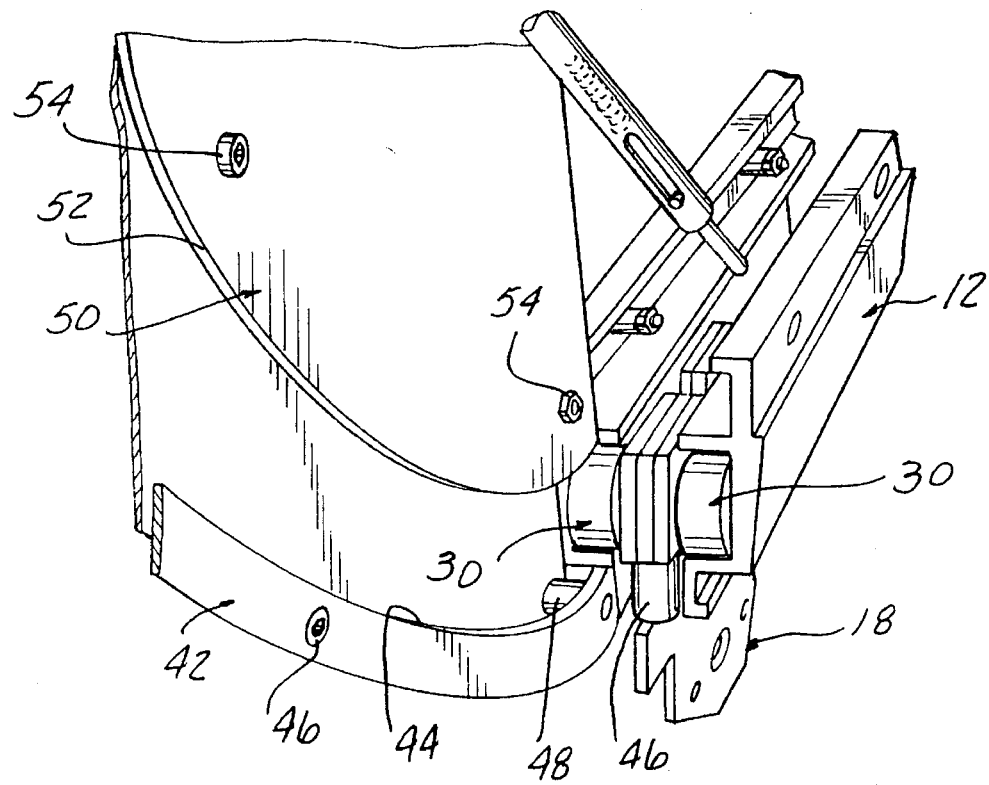
FIG. 3 is a fragmentary perspective view of a portion of the gravity conveyor shown in FIG. 1 with some of the components removed in order to show the connection between the advance conveyor lower section and the end return radiused track structures.
Figure 2:
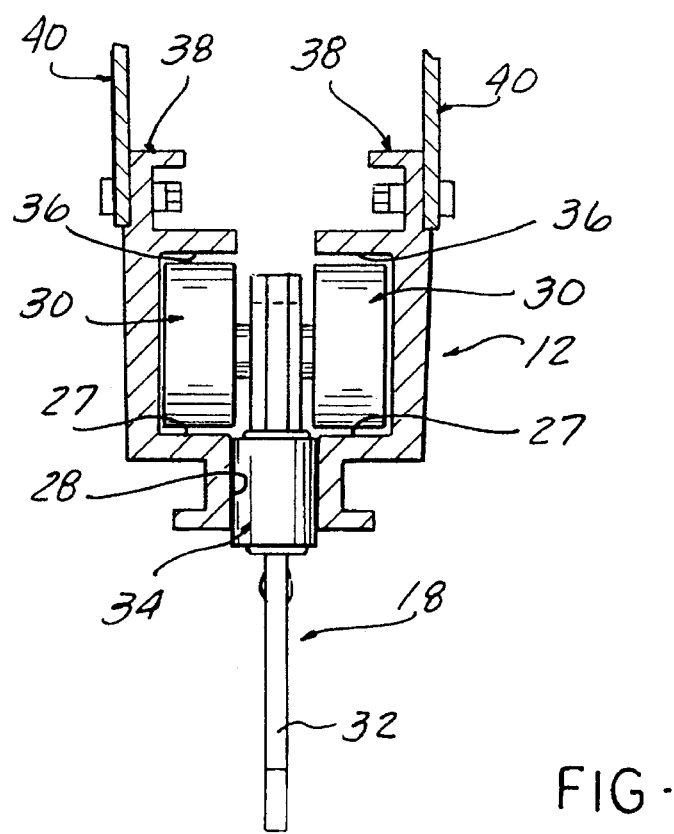
FIG. 2 is a transverse section view taken through the lower section of the gravity conveyor shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, a gravity conveyor 10 is shown including an inclined advancing lower section 12 and a return upper section 14. The lower advancing section 12 is inclined downwardly from right to left, i.e., from a loading point to an unloading point, which may be defined by a stop mechanism 16 controlled to extend a plunger into the path of the trolley and stop its movement. The return section 14 is inclined downwardly from the left to the right as viewed in FIG. 1.

A series of load supporting trolleys 18 descend by gravity down the length of the advance section 12 from right to left as viewed in FIG. 1, around a first radiused track end section 20 at the left end, forced therearound by a first drive transfer mechanism 22 according to the present invention, and descend from left to right down the return conveyor section 14 and pass around, by gravity, a second radiused track end section 24 to be received into the lower advancing section 12.

The conveyor is typically supported for overhead location as by a framework 26, only a small portion of which is shown in FIG. 1. Each of the conveyor sections 12, 14 comprise an aluminum extrusion defining lower rolling surfaces 27 adjacent an open slot 28 enabling the trolleys 18 to roll therealong by means of a pair of spaced support rollers 30 rotatably mounted on the upper part of the trolley 18.

A tail portion 32 projects through the slot 28 and is suitably configured to provide engagement with load holding hooks, etc., not shown. A pair of guide rollers 34 mounted for rotation about a vertical axis are fit within the slot 28 which serve to absorb the transverse forces exerted thereon so as to allow relatively friction-free movement of the trolley 18 along the return and advance conveyor sections 12 and 14.

An upper wall defines upper surfaces 36 down which roll the support rollers 30 during the return movement down the return conveyor section 14. The return section 14 is formed from the same aluminum extrusion shape as the lower section 12, but in an inverted orientation.

The extrusion shape also provides a pair of flanges 38 enabling attachment of various structures, including a pair of side plates 40 included in the first radiused track end section 20. Attached to each of the side plates 40 is an outer curved guideway piece 42 on each side, only one shown in FIG. 3, each of which having an inner arcuate surface 44 which is aligned with the roller surfaces 27 such as to provide a radiused extension thereof.

The curved pieces 42 are attached to the end plates 40 by means of screws 46 and standoffs 48 such as to be spaced inwardly and aligned with the trolley support rollers 30 after passing off the lower conveyor section 12.

Also provided is an inner guide plate 50 attached to each side plate 40 and defining an arcuate roller surface 52 aligned with the upper guide roller surfaces 36, the inner guide plate 52 similarly attached with screws 54 and spacers (not shown).

FIG. 4 shows additional details of the trolley construction, FIG. 4 depicting two queued trolleys 18A, 18B. The trolleys 18A, 18B are preferably of a laminated plate design, including an upper spacer plate 56 providing additional support for the rollers 30, a main plate 58 having notches 60 for receiving the support pins for the guide rollers 34, secured by means of riveted fasteners 62.

Each of the trolleys 18A, 18B is provided with a central notched-out recess 64 provided in the top portion as an engagement feature for the drive return mechanism 22. The drive return mechanism 22 includes a drive rod assembly 66 clamped to a rotary shaft 68 supported by a bearing assembly 70 on either side of respective side plates 40, and attached by means of a split collar 72.

An electric motor 74 is mounted atop the lower conveyor section 12, and a chain drive 76 and sprocket 78 enables powered rotation of the shaft 68 to cause the drive rod assembly 66 to sweep around the track defined by the surfaces 44 of curved guide pieces 42 and surfaces 52 of guide plates 50.

The drive rod assembly 66 includes a fixed inner tube 80 slidably receiving a spring-loaded plunger 82 comprising a trolley engaging element. A compression spring 84 is mounted within the tube 80 and urges the plunger 82 to an extended position. A pin 86 extends outwardly into a slot 88 in the tube 80 limiting the outer travel of the plunger 82. As the shaft 68 rotates, the plunger 82 is normally extended. The outermost position of the plunger 82 is such as to engage a side surface 89 on the rear or trailing side of each trolley 18.

If there is not a queued trolley 18A to the rear of the trolley located beneath the shaft 68, the trailing side of the trolley is immediately engaged by the side of the plunger 82 of rod assembly 66. In this event, the rotation of the shaft 68 and sweeping movement of the rod assembly 66 causes the trolley to be moved around the first radiused track end section 20 and upwardly to be deposited on the return conveyor section 14 for gravity return to the right hand side of the conveyor.

In the event there is one or more queued trolleys 18A to the rear of the trolley 18B, the plunger 82 engages the upper surface 90 and is retracted as the rod assembly 66 rotates past the trolleys 18A, 18B until reaching the recess 64 of the lead trolley 18B, at which time the plunger 82 is extended such as to be received into the recess 64. This establishes a driving engagement such that the trolley 18B is driven along the tracks defined by the first radiused track end section 20 to be deposited onto the return conveyor section 14 as before.

Additional drive rod assemblies 66A, 66B as shown in FIG. 6 can be provided in opposing orientation such as to balance the loading of the shaft 68 and to provide an increased frequency of transfer from the lower to upper conveyor sections for each revolution of the shaft 68. Additional sets of drive rod assemblies also may be provided.

It can be appreciated that a relatively simple mechanism has been provided which has been found to operate reliably in engaging either single or accumulated trolleys for transfer between the conveyor sections.

It can be appreciated that the free rolling trolleys 18 can impact a next ahead trolley which is stopped in a queue. When heavily loaded, impacting forces can become excessive. The trolleys rapidly move around the second radiused track end section since this descent is uncontrolled.

Figure 7:
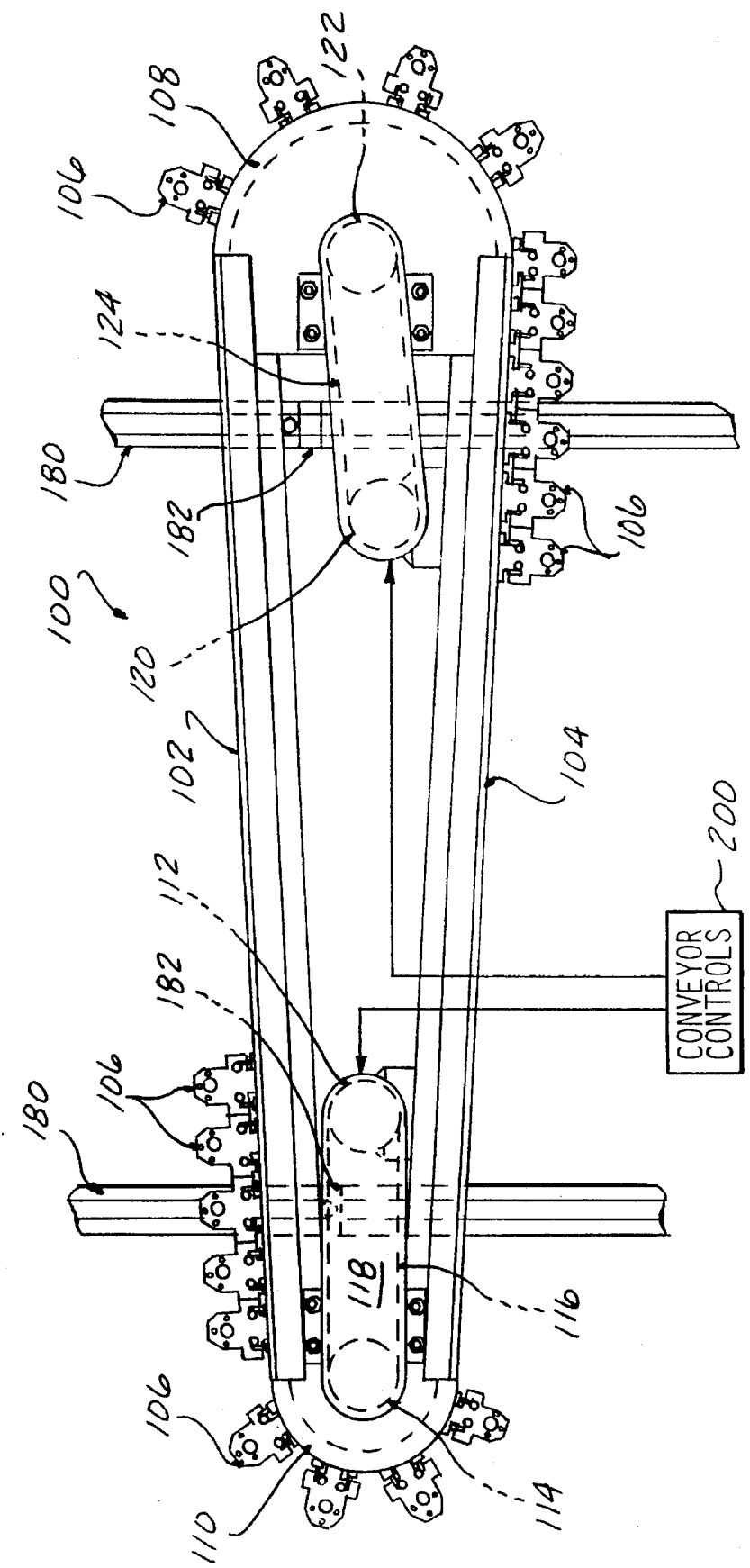
FIG. 7 is a fragmentary side elevational view of a second embodiment of a gravity conveyor according to the invention.
Figure 8:
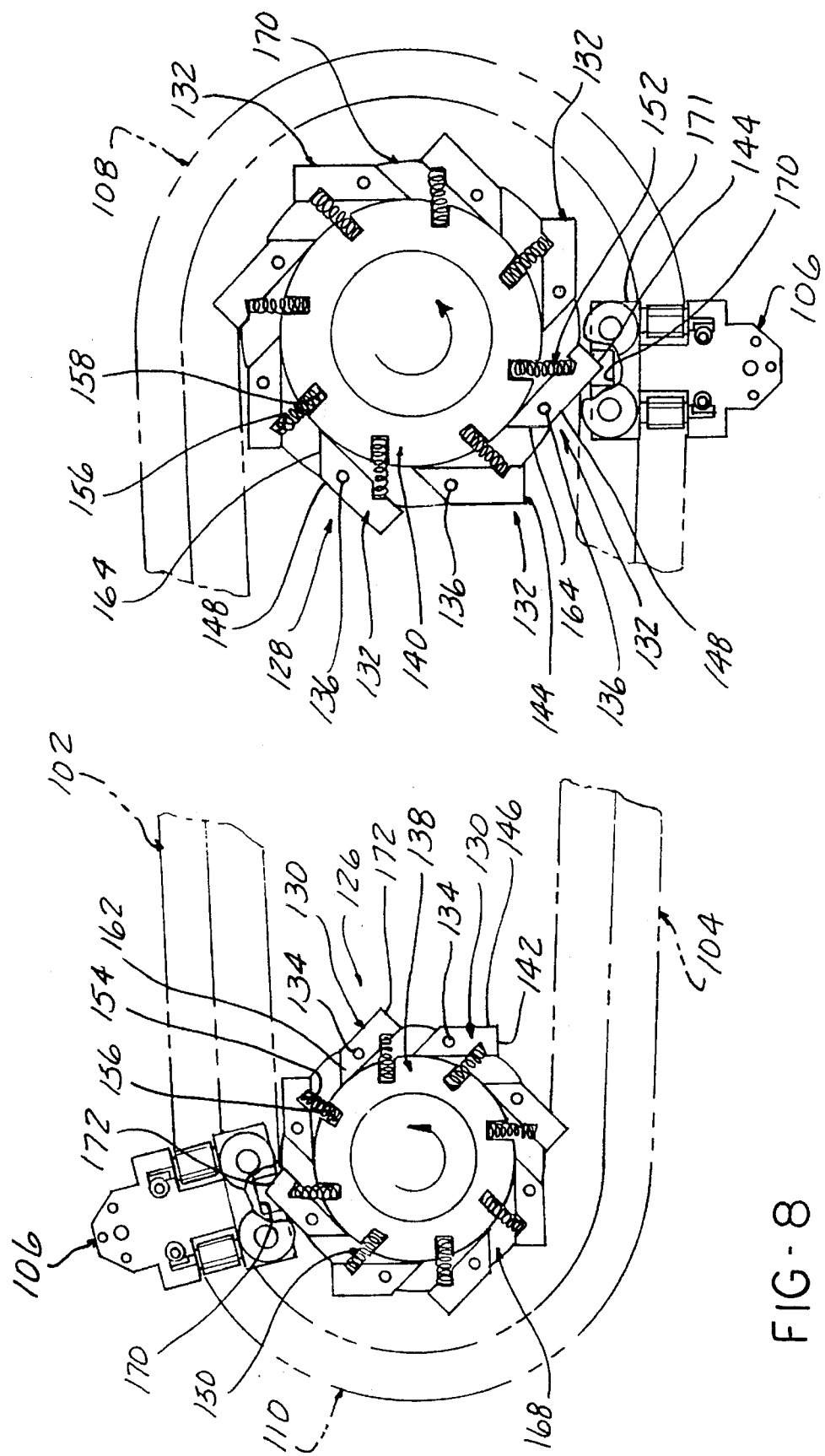
FIG. 8 is an enlarged side elevational view of the pivoted dog sprockets used in the conveyor of FIG. 7.

FIGS. 7 and 8 show a preferred embodiment of the gravity conveyor according to the invention. The conveyor 100 includes an upper section 102 and lower section 104, each inclined in opposite directions to converge at one end and diverge at the other. The inclination of the upper section 102 and lower section 104 allows gravity induced descent of roller supported and guided trolleys 106 from the relatively elevated end of each section to the lower end.

A larger first radiused track end section 108 connects the divergent ends of upper track section 102 and lower track section 104 shown on the right, while a smaller second radiused track end section 110 connects the convergent ends of the upper track section 102 and lower track section 104.

The details of the guide tracks included in the conveyor sections and the trolley rollers are similar to those described above.

In this embodiment, a second electric drive motor 112 is also provided at the smaller end 110 powering a sprocket 114 by means of a chain 116, a cover 118 protecting against inadvertent contact with these elements. A controlled descent of the trolleys 106 is thereby provided by a positive engagement with the trolleys 106 as will be described below.

A first elevating electric drive motor 120 is provided at the large diameter end 108 powering a sprocket 122 by a chain 124.

A powered elevation of the trolleys 106 from lower section 104 to the upper section 102 is accomplished by a positive engagement which allows limited overrunning to reduce stresses caused by impacting of queued trolleys as will be described below.

FIG. 8 shows respective pivoted dog sprockets 126 and 128 which comprise rotary members respectively driven by electric drive motors 112, 120 by connections to drive sprockets 114, 120. The rotation of each is about an axis aligned with the center of the respective end sections 108, 110.

Each of the pivoted dog sprockets 126, 128 has a circumferentially spaced array of dogs 130, 132 pivoted at 134, 136 to a respective sprocket outer hub 138, 140. Each dog 130, 132 has a blunt engagement end surface 142, 144 and a shallowly inclined outer side 146, 148.

Compression springs 150, 152 are held in pockets 154, 156 formed in an inside edge of dogs 130, 132 and pockets 158, 160 in the perimeter of the center carrier hub 138, 140.

The compression springs 150, 152 urge the dogs 130, 132 to be pivoted radially outwardly until tail portions 162, 164 of the respective dogs 130, 132 located on the other side of pivots 134, 136 stop against the outer perimeter of the center carrier hubs 138, 140.

The carrier hubs 138, 140 are sandwiched between pairs of larger diameter guide hubs 166, 168, only one guide hub 166, 168 shown in FIG. 8, the outer perimeter of each approximately aligned with the inner track of the respective end section 110, 108 so that the trolleys 106 are positioned approximately as shown.

At the elevating end of lower section 104, the trolleys 106 queue up moving from left to right. The carrier sprocket 140 rotates counterclockwise as indicated with the dogs 132 rotate down towards the next queued trolley 106.

If the recess 170 in the center plate 171 of the trolley 106 is not aligned, the corner forming the engagement end surface 144 is pushed by the adjacent top surface 172, causing the dog 132 to be pivoted radially inwardly against the force of the associated spring 165. As the sprocket 140 continues to rotate, the bottom corner of the surface 144 eventually aligns with the recess 170, and the spring 164 moves the dog back out radially, establishing a positive engagement, and causing the trolley 106 to be carried around end section 108 to the top of section 102.

If another trolley 106 impacts the engaged trolley 106, the engaged trolley can overrun by pushing against the lower side 148 to pivot the dog 132 out of the recess 170.

The pivots 136 are located off center towards the tail portion 164 to enable this disengagement while positively locking when the end surface 144 is pushing against the side of the recess 170.

The engagement end surface 144 can also engage the side of the center plate 171 of the trolley 106, if there are no queued other trolleys 106.

At the other end, the rotation of the carrier sprocket 136 functions to produce a controlled descent of the trolleys around end section 110. The engagement surfaces 173 of the dogs 130 act to hold back the trolleys 106 as the corners of the rear end move into recesses 170. This effect limits the speed of the trolleys 106 coming out of the end section 110 to that allowed by the rotative speed of the sprocket 126.

This effect can also be employed in lieu of stop mechanisms by indexing drive of the sprocket 126 to control the timing of release of the trolleys 106 to descend lower conveyor section 104.

Control of drive motors 112, 120 with conveyor controls 200 allows either the upper section 102 or lower section 104 to be used as the active section and the other as the return run, by control of feed of trolleys to either section 102, 104.

The conveyor 100 may be supported on stanchions 180 (FIG. 7), with adjustment slides 182 allowing either end to be raised or lowered to control the speed of gravity induced rolling of the trolleys 106.

I claim:

1. In a gravity conveyor including upper and lower oppositely inclined sections connected to each other at diverging ends by a first radiused track end section, connected to each other at converging ends with a second radiused track end section, smaller sized than said first radiused track end section, and a plurality of trolleys having support rollers enabling said trolleys to roll down said upper section, around said first radiused track end section and down said lower section, a return mechanism for returning said trolleys from a lower end of said lower conveyor section up around said second radiused track end section to an upper end of said upper conveyor section, said return mechanism comprising:

a first rotary member mounted for rotation about the center of said first radiused track end section;

a first drive motor rotating said rotary member;

a spring-loaded engagement element mounted to said rotary member adapted to be retracted against a spring force urging at least a portion said element radially outwardly;

each of said trolleys including a recess in an upper portion thereof with said trolley on said lower conveyor section, said recess adapted to receive an end of said element as said first rotary member rotates to carry said first rotary element across an upper surface of a trolley disposed at said lower end of said lower conveyor section;

said spring-loaded engagement element moved radially outwardly into said recess, thereby establishing a driving engagement of said engagement element with said trolley to cause said trolley to be swept around said first track end section by rotation of said first rotary member and deposit said trolley onto said upper end of said upper conveyor section.

2. The gravity conveyor according to claim 1 wherein said first rotary member comprises a rod assembly, said rod assembly including a spring-loaded plunger at the outer end adapted to be retracted against a spring force urging said plunger outwardly.

3. The gravity conveyor according to claim 1 wherein said first radiused track includes a pair of side plates, a pair of outer arcuate pieces, each defining a radiused surface aligned with one of a pair of roller surfaces on said lower end of said lower conveyor section to define a roller track to receive said trolleys driven by said drive mechanism, and a pair of inner plates each defining an inner surface aligned with a respective one of a pair of roller surfaces on said upper end of said upper conveyor section, said inner surfaces supporting each of said trolleys as said trolleys become inverted in moving around said second radiused track and guiding said trolleys onto said upper track section.

4. The gravity conveyor according to claim 1 wherein said first drive motor comprises an electric motor and a chain loop engaging a sprocket on an output shaft of said electric motor and a sprocket drivingly connected to said first rotary member.

5. The gravity conveyor according to claim 1 wherein each trolley has a trailing edge engaged by said element if another trolley is not queued behind said trolley.

6. The gravity conveyor according to claim 1 wherein said first rotary member comprises a carrier sprocket having a series of dogs pivotally mounted about a perimeter of said carrier sprocket, each of said dogs having an engagement end urged radially outward by a spring to be positioned to engage a leading side of said recess in each trolley, but able to be forced radially inward when engaging portions of said trolley adjacent said recess have a trailing surface adjacent said engagement end.

7. The gravity conveyor according to claim 6 wherein said dogs are each configured to be able to be forced radially outward by a trailing edge of a trolley recess, whereby said trolleys can overrun said engagement with said engagement end of said dogs when impacted from the rear.

8. The gravity conveyor according to claim 1 further including a second rotary member mounted for rotation about the center of said second radiused track end section, a second drive motor rotating said second rotary member;

an engagement element mounted to said second rotary element extending radially to engage each of said trolleys to restrain movement thereof around said second radiused track end section so that said trolleys are lowered from said upper section to said lower section at the speed of rotation of said second rotary member.

* * * * *